3,071,564
SOLUTION POLYMERIZATION OF TRIOXANE
Charles A. De Fazio and Raymond J. Kray, Summit, N.J., assignors to Celanese Corporation of America, New York, N.Y., a corporation of Delaware
No Drawing. Filed Dec. 10, 1958, Ser. No. 779,289
11 Claims. (Cl. 260—67)

This invention relates to an improved method for producing a tough, high-molecular weight material by the polymerization of trioxane.

Trioxane may be polymerized in the presence of small amounts of certain catalytic materials, principally fluorine containing materials, to produce a tough, high molecular weight polymer known as polyoxymethylene which may be used to produce molded or extruded products. The procedures utilized involve the blending of moltent trioxane with the catalytic material, when the latter is normally liquid material.

Such procedures are disadvantageous in that they are not readily adaptable to large-scale production methods and in that, particularly with rapidly acting catalytic materials it is difficult to obtain uniform admixture of the reaction components before substantial reaction takes place.

In an improved process, disclosed in application Serial No. 691,145, filed October 21, 1957, by Donald E. Hudgin and Frank M. Berardinelli, trioxane is dissolved in a large volume of a non-aqueous solvent and polymerization takes place in solution with the polymer precipitating out of solution as it is formed.

In accordance with this invention we have found that the molecular weight of the polymers produced in solution polymerization may be increased and that the thermal degradation properties of the polymers produced may be enhanced.

It is an object of this invention to produce high molecular weight polymer in good yield and having excellent thermal degradation properties by an improved process of solution polymerization. Other objects will appear hereinafter.

The objects of this invention are achieved by the solution polymerization of trioxane in a reaction zone maintained under autogenous pressure. Since the polymerization of trioxane in solution produces a relatively small amount of formaldehyde and other gases, it is suprising that substantially higher molecular weights of polymer may be obtained by sealing the evolved gas into the system. Furthermore, since the polymers produced directly from formaldehyde in acidic polymerization are generally brittle and of low molecular weight, it is surprising that the retention of formaldehyde in the polymerization system helps to produce a tougher polymer and a polymer of higher molecular weight.

The catalysts which are particularly useful in the process of this invention are the catalysts of high activity and particularly catalysts which are capable of polymerizing molten trioxane in bulk to the extent of 40% in one hour at a temperature allowed to rise from an initial temperature of 70° to a final temperature of 100° C. when present in a concentration of 0.01 weight percent. Catalysts comprising boron fluoride coordinate complexes with organic compounds in which oxygen or sulfur is the donor atom are particularly useful. Catalysts comprising boron fluoride coordinate complexes with water are also very useful. Such catalysts are described, respectively, in application Serial No. 691,143, filed October 21, 1947, and application Serial No. 718,124, filed February 28, 1958, both applications filed by Donald E. Hudgin and Frank M. Berardinelli.

The coordinate complex with boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. Boron fluoride complexed with higher ethers such as dibutyl ether are also very effective. Other boron fluoride complexes which may be used are the complexes with ethanol, with methanol, with butanol, with methyl acetate, with ethyl acetate, with phenyl acetate, with benzoic acid, with acetate, with phenyl acetate, wit hbenzoic acid, with acetic anhydride, with acetone, with methyl ethyl ketone, with dimethyl ether, with methyl phenyl ether, with acetaldehyde, with chloral, with dimethyl sulfide and with ethyl mercaptan. Among the complexes with water which may be used are boron fluoride monohydrate and boron fluoride dihydrate.

The catalyst is introduced into the trioxane solution in amounts between about 0.001 and about 1.0% by weight and preferably between about 0.01 and about 0.20%.

The preferred solvents are mutual solvents for the catalyst and for trioxane. Among the specific solvents found to be satisfactory with boron fluoride coordinate complexes are cyclohexane, benzene, ethylene dichloride, pentane, hexane, heptane, trichloroethylene, ligroin (90 to 100° C. boiling point), carbon tetrachloride, symmetrical tetrachloroethane, nitromethane, nitroethane, 1, 1, 2 trichloroethane, diethyl ether, petroleum ether (30 to 60° C. boiling point), methylene chloride, and a mixture of tetrahydrofuran and methyl cyclohexane.

The solvent is generally included in an amount sufficient to maintain the reaction product as a flowable slurry. In general, amounts between about 0.4 and 10 parts by weight of solvent are used for each part of trioxane, preferably between 0.8 and about 5 parts by weight.

The temperature in the reaction zone is such that the reactants are maintained in the liquid phase. The precise temperature range depends to some extent on the nature of the solvent, and the activity of the catalyst. In general temperatures between about 25 and about 125° C. may be used, and preferably temperatures between about 40 and about 80° C.

The reactants are generally maintained in the reaction zone for a period between about ½ hour and about 18 hours. The reaction period is preferably between about 1 and about 6 hours.

The process of this invention, as stated above, involves polymerization in a reaction zone maintained under autogenous pressure. The degree of pressure developed depends upon the temperature of the reaction, the selectivity of the reaction with respect to the production of polymer in relation to the production of gaseous by-products, the nature and amount of the solvent and the degree to which the reaction zone is sealed.

In general, the process of this invention will develop autogenous pressures between about 0.5 and about 30 pounds per square inch gauge. In most cases the reaction zone is sealed and the full pressure developed is maintained. It is to be understood, however, that one may permit controlled bleeding of the product gases and thereby develop only a portion of the potential autogenous pressure.

During the course of the reaction, polymer is formed and forms a separate solid phase. The reaction zone is preferably agitated so that the polymer particles are maintained in suspension in uniform distribution throughout the reaction mass. Upon completion of the reaction the reaction mass comprises a mixture of polymer particles and a solution of unreacted trioxane in the solvent. There is also a small amount of excess catalyst in the reaction product.

The reaction product is preferably treated with a stoichiometric excess of a catalyst neutralizing agent, such as an aliphatic or a heterocyclic amine, in order to avoid degradation of the polymer. A detailed description of the use of catalytic neutralizing agents is disclosed in the application of Hudgin and Berardinelli, Serial No. 718,147, filed February 28, 1958. Among the amines which may be used are n-butylamine, di-n-butylamine, tri-n-butylamine and pyridine.

After neutralization of the catalyst the reaction slurry may be treated to separate the polymer particles from the trioxane solution. If there is a substantial difference between the density of the liquid and that of the polymer, separation may be made by means of this difference, as by decantation or centrifugal separation in the case where the polymer is the denser material, or by skimming the polymer off the surface of the liquid in the case where the polymer is the less dense material. In any case, filtration provides a convenient way of separating the polymer from the liquid.

*Example I*

Trioxane 25 g. and cyclohexane 21 g. were charged to a borosilicate glass tube, 20 mm. in diameter and 300 mm. in length. Boron trifluoride diethyl etherate catalyst, 0.04% by weight based on the total charge was then added and the tube sealed with a 24/40 $T_s$ stopper wired in place. The tube was rotated at 20 r.p.m. for 6 hours in a constant temperature bath at 68° C. and then opened and the polymer filtered off. The polymer was washed at 80° C. first with a 5 percent sodium carbonate solution followed by two water washes. The dried polymer (43% yield) had an inherent viscosity of 2.20 in p-chlorophenol and was compression molded to form a tough disc, having a weight of 2 grams and having a thermal degradation rate of 1.1% per minute at 222° C. Inherent viscosity in this and succeeding examples is determined in a 0.1% by weight solution in p-chlorophenol at 60° C. Thermal degradation is determined by the percentage of weight loss in a unit time in a sample maintained in circulating air at 222° C.

*Example II*

Trioxane 25 g. and cyclohexane 21 g. were charged to the tube of Example I. Boron trifluoride diethyl etherate catalyst, 0.135% by weight based on the total charge was then added and the tube sealed with a 24/40 $T_s$ stopper wired in place. The tube was rotated at 20 r.p.m. for 1 hour in a constant temperature bath at 75° C. The polymer was then removed from the tube and washed as described in Example I. The dried polymer was isolated in a 39% yield and had an inherent viscosity of 1.75 in p-chlorophenol. The polymer was molded to form a tough disc.

*Example III*

Trioxane 25 g. and cyclohexane 21 g. were charged to the tube of Example I. Boron trifluoride diethyl etherate catalyst 0.09% by weight based on the total charge was then added and the tube sealed with a 24/40 $T_s$ stopper wired in place. The tube was rotated at 20 r.p.m. in a constant temperature bath at 68° C. for 6 hours. The polymer was then filtered off and washed as described in Example I. The dried polymer (24% yield) had an inherent viscosity of 2.43 in p-chlorophenol and was compression molded to form a tough 2 g. disc.

*Example IV*

Trioxane, 24 g. and 16 g. of cyclohexane were charged to the tube of Example I. Boron trifluoride dihydrate catalyst 0.05% by weight based on the total charge was then added and the tube sealed. The tube was rotated at 20 r.p.m. for 3 hours at 75° C. The polymer was then filtered off and washed as described in Example I. The dried polymer (51% yield) had an inherent viscosity of 1.35 and was compression molded to form a tough disc. The polymer had a thermal degradation rate of 2.6% per minute at 222° C.

*Example V*

Trioxane, 20 g. and 20 g. of n-pentane were charged to the tube of Example I. Boron trifluoride diethyl etherate catalyst, 0.15% by weight, based on the total charge, was added and the tube sealed. The tube was rotated at 20 r.p.m. for 3 hours at a temperature of 55° C. The batch was then neutralized with 0.84 ml. of tributyl amine dissolved in 250 ml. of cyclohexane and the mixture heated to 70° C. with stirring for ½ hour. The polymer was then filtered off and washed twice with water at 80° C. for ½ hour per wash. The polymer was dried in a forced air draft oven at 70° C. for 16 hours. The dried polymer (29% yield) had an inherent viscosity of 2.1.

When these polymerizations were repeated in round bottom flasks at atmospheric pressure but with identical reaction periods, temperature and charges, lower molecular weight polymers were produced. The highest molecular weight polymer produced in a flask was made under the conditions described in Example I and had an inherent viscosity of 1.3. The lowest molecular weight polymer produced in a flask was made under the conditions described in Example II and had an inherent viscosity of 0.7. In opening the sealed tube polymerizations considerable gas pressure was observed at the end of the run. Pentane (Example V) has a boiling point of 36° C. and at the temperature of polymerization (55° C.) considerable pressure was generated.

It is to be understood that the foregoing detailed description is given merely by way of illustration and that many variations may be made therein without departing from the spirit of our invention.

Having described our invention what we desire to secure by Letters Patent is:

1. In the process for preparing a tough high molecular weight moldable polymer wherein trioxane is dissolved in a solvent and polymerized in solution in said solvent in contact with a trioxane polymerization catalyst in a reaction zone the improvement which comprises maintaining said reaction zone under superatmospheric autogenous pressure.

2. A process for preparing a tough, high molecular weight moldable polymer which comprises preparing a solution comprising trioxane and a trioxane polymerization catalyst in a trioxane solvent and polymerizing said trioxane in said solution in a reaction zone maintained under superatmospheric autogenous pressure.

3. The process of claim 2 in which from about 0.4 to about 10 parts by weight of solvent are used for each part of trioxane.

4. The process of claim 2 in which said polymerization is carried out at a temperature between about 25° and 125° C. for a period between about 0.5 and about 18 hours.

5. A process for preparing a tough, high molecular weight moldable polymer which comprises preparing a solution comprising trioxane, from about 0.001 to about 1.0 weight percent based upon the weight of trioxane of a trioxane polymerization catalyst comprising a boron fluoride coordinate complex with an organic compound in which oxygen is the donor atom and from about 0.4 to 10 parts by weight of a trioxane solvent and polymerizing said trioxane in solution at a temperature between about 25° and about 125° C. for a period between about 0.5 and about 18 hours in a sealed reaction zone under superatmospheric autogenous pressure.

6. The method of claim 5 wherein said solvent is cyclohexane.

7. The method of claim 5 wherein said solvent is n-pentane.

8. The method of claim 5 wherein said solvent is benzene.

9. The method of claim 5 wherein the polymerization reaction product is treated with a catalyst neutralizing agent prior to the separation of polymer therefrom.

10. The method of claim 5 in which polymer is recovered by filtration.

11. The method of claim 5 in which said polymer is recovered by difference in density between it and the suspending liquid.

References Cited in the file of this patent

UNITED STATES PATENTS

| | | |
|---|---|---|
| 2,270,135 | Mikeska et al. | Jan. 13, 1942 |
| 2,296,249 | Austin | Sept. 22, 1942 |
| 2,768,994 | MacDonald | Oct. 30, 1956 |
| 2,795,571 | Schneider | June 11, 1957 |
| 2,989,508 | Hudgin et al. | June 20, 1961 |